(12) United States Patent
Edwards et al.

(10) Patent No.: US 10,541,812 B2
(45) Date of Patent: Jan. 21, 2020

(54) TOKEN ARCHITECTURE FOR DETERMINING CONTENT ITEM VALUES

(71) Applicant: Facebook, Inc., Menlo Park, CA (US)

(72) Inventors: Mark Jonathan Edwards, London (GB); Ter Chrng Ng, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 375 days.

(21) Appl. No.: 15/476,909

(22) Filed: Mar. 31, 2017

(65) Prior Publication Data

US 2018/0288034 A1    Oct. 4, 2018

(51) Int. Cl.
*H04L 9/32* (2006.01)
*H04L 29/06* (2006.01)
*G06F 16/958* (2019.01)

(52) U.S. Cl.
CPC .......... *H04L 9/3213* (2013.01); *G06F 16/958* (2019.01); *H04L 63/205* (2013.01)

(58) Field of Classification Search
CPC ...... H04L 9/3213; H04L 63/205; H04W 4/23; G06F 16/958; G06Q 30/0277
USPC ........................................... 707/758
See application file for complete search history.

(56) References Cited

U.S. PATENT DOCUMENTS

| | | | | |
|---|---|---|---|---|
| 9,081,808 B1* | 7/2015 | Kiveris | .............. | G06Q 30/0251 |
| 2009/0070286 A1* | 3/2009 | Liss | ....................... | G06Q 10/10 |
| 2015/0149583 A1* | 5/2015 | Chung | .................. | G06F 16/435 |
| | | | | 709/217 |
| 2017/0251081 A1* | 8/2017 | Roychowdhury | ...... | H04L 67/02 |
| 2018/0253759 A1* | 9/2018 | Deng | .................. | G06Q 30/0254 |
| 2018/0285469 A1* | 10/2018 | Hahn | .................. | H04L 67/2804 |

OTHER PUBLICATIONS

Ad Ops Insider. "Online Ad Verification & What it Means for Online Publishers". Published Apr. 2, 2010. Accessed Jun. 4, 2019 from <https://www.adopsinsider.com/online-ad-measurement-tracking/online-ad-verification-what-it-means-for-online-publishers/> (Year: 2010).*

* cited by examiner

*Primary Examiner* — Robert W Beausoliel, Jr.
*Assistant Examiner* — Arthur Ganger
(74) *Attorney, Agent, or Firm* — Fenwick & West LLP

(57) ABSTRACT

An online system provides content item values for content items to be displayed via publisher servers on client devices of users. For example, the content items include text, images, or video for display on user interfaces such as webpages. The online system may compete with other third party systems that also provide content items for display via the publisher servers. To reduce latency between requests and responses by the online system, the online system may pre-determine a candidate content item value before an opportunity occurs to display a content item. The online system may associate candidate content item values with tokens provided to client devices. Additionally, the online system may use different types of content item value predictors that provide a range of content item values and that require varying amounts of latency to determine the content item values.

20 Claims, 8 Drawing Sheets

410

Receive a content item value request from a publisher server
420

Provide content item value requests to value predictors
430

Receive one or more responses from the value predictors
440

Select a content item value of one of the responses
450

Provide the selected content item value to the publisher server
460

Receive a content item request
470

Select a candidate content item based on the selected content item value
480

```
Receive user information from a client device and a publisher
identifier from a publisher server
610
         │
         ▼
Generate a token
620
         │
         ▼
Provide the token to the client device
630
         │
         ▼
Determine a candidate content item value before receiving a
content item value request
640
         │
         ▼
Provide the candidate content item value to the publisher
server
650
```

FIG. 6

TOKEN ARCHITECTURE FOR DETERMINING CONTENT ITEM VALUES

BACKGROUND

This disclosure generally relates to determining content item values and particularly to optimizing the determination of the content item values to save resources of an online system.

Publishers can communicate content to users on digital platforms such as webpages or applications. A publisher's webpage may include content that is native to the publisher, as well as content items (e.g., including text, images, video, etc.) from various other domains or systems (e.g., online systems or third party systems). For a given opportunity to display a content item in a webpage, the publisher may request content items from different systems. Based on responses from the different systems, the publisher determines to display a content item from a selected system. The publisher may receive a contribution from the selected system for displaying the content item.

An online system typically has access to large amounts of information describing characteristics of users of the online system and actions performed by the users. Because of the increasing amount of user-specific information maintained by such online systems, an online system may determine that particular users are likely to be interested in or interact with certain content items. Thus, the online system may want to provide these content items for display to the users on a publisher's webpage or application. However, the online system may need to compete with other third party systems that also want to provide content items for display on the publisher's webpage or application. It is challenging and desirable for the online system to increase the likelihood that publishers will select content items from the online system for display, and to achieve this goal while efficiently using available resources.

SUMMARY

An online system provides content item values for content items to be displayed via publisher servers. The online system may compete with other third party systems that also provide content items for display via the publisher servers. For example, when a user views a webpage or application (or any other suitable user interface) of a publisher server, an opportunity (also referred to herein as an "impression opportunity") is generated to provide a content item for display to the user. To select a content item for the impression opportunity, the publisher server requests content item values from systems such as the online system and the third party systems. In response, the systems provide content item values representing an amount of compensation that an originating system will provide to the publisher server for displaying a content item from the originating system.

In one embodiment, the online system implements a token architecture to provide content item values. The online system generates a token based on user information from a client device and a publisher identifier of a publisher server. The online system may determine that the user information is associated with a user account of the online system and validate the publisher server based on the publisher identifier. In other words, for the validation, the online system determines if the publisher server has, for example, a webpage that is suitable for displaying content items from the online system. The online system provides the token to the client device.

When an impression opportunity occurs, the online system receives a content item value request and the previously provided token. The online system can provide a candidate content item value that is determined before the impression opportunity occurs, for example, based on information associated with the token. The content item value for the token may be determined after the token is generated for the user and the publisher. Thus, the validation and token permit the online system to reduce the latency between receiving the content item value request and responding to the request by providing the candidate content item value. The publisher server may be more likely to select the candidate content item value if there is less latency.

In one embodiment, the online system uses multiple content item value predictors to determine content item values to provide to publisher servers. The content item value predictors may predict content item values that are likely to be selected by the publisher servers. In addition, the content item value predictors predict the content item values based on, for example, a cache of recently provided content item values, metrics of historical data of previously provided content item values, a machine learning model, or a database of content item values and content items.

The online system may request content item values from different content item value predictors and receive responses from any number of the content item value predictors. The responses may include a range of content item values. For example, a cache-based content item value predictor provides responses with an average content item value less than the average content item value of responses from a historical data-based content item value predictor. Further, the different content item value predictors may respond within varying amounts of latency. For example, the cache-based content item value predictor provides responses within an average latency less than the average latency of responses from the historical data-based content item value predictor. The online system selects a content item value of one of the received responses. For instance, the online system selects the greatest content item value received or the first content item value received.

BRIEF DESCRIPTION OF DRAWINGS

FIG. 4B is a flowchart illustrating a process for optimizing the determination of content item values according to one embodiment.

FIG. 6 is a flowchart illustrating a process for determining content item values using a token architecture according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
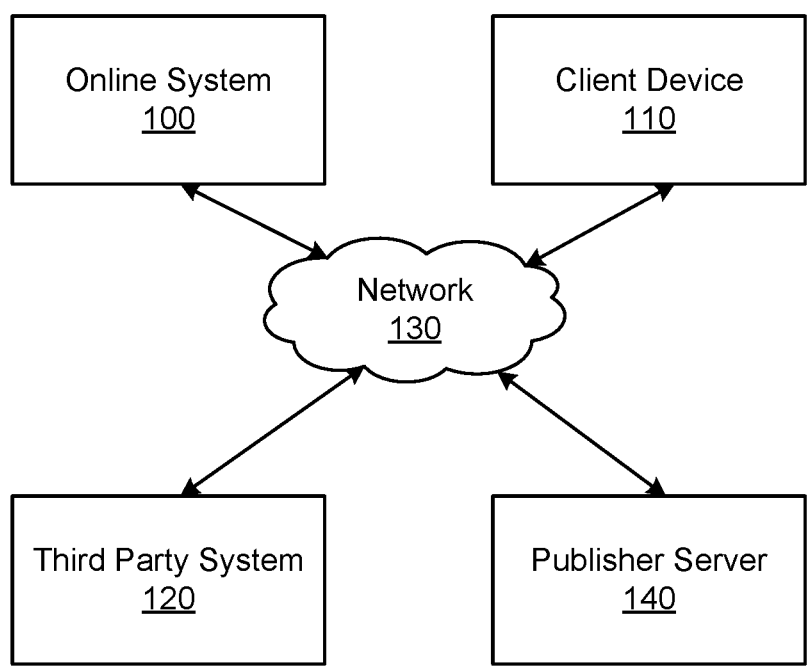
FIG. 1 is a diagram of a system environment for determining content item values according to one embodiment.

FIG. 1 is a diagram of a system environment for determining content item values according to one embodiment. The system environment includes an online system 100, one or more client devices 110, one or more third party systems 120, and one or more publisher servers 140, connected to each other via a network 130. In other embodiments, different and/or additional entities can be included in the system environment. The publisher server 140 uses content item values to select the online system 100 or a third party system 120 to provide content items to users accessing the publisher server 140. To reduce the latency of content item values used by the publisher server 140 to determine this selection while maintaining accuracy of the values, the online system 100 may use a token system to predetermine a value for a given user at the publisher server 140, and may also use a set of value predictors having varying accuracy and latency characteristics, such that the best predicted value can be determined, e.g., given the time constraints for the publisher server 140.

The online system 100 allows users of the online system 100 to communicate or otherwise interact with each other and access content. The online system 100 receives information about the users, for example, user profile information and information about actions performed by users on the online system 100, a third party system 120, or a publisher server 140. The online system 100 can also provide content items for communication to users via client devices 110. The online system 100 determines content item values for content items. In some embodiments, the online system 100 provides an amount of compensation to an entity associated with the publisher server 140 when a content item from the online system 100 is sent to a user. The amount of compensation is based on the content item value corresponding to the communicated content item.

In addition to the online system 100, a third party system 120 can also provide content items for communication to users via client devices 110. Similar to the online system 100, a third party system 120 may determine content item values for content items. Further, the third party system 120 provides an amount of compensation to an entity associated with publisher server 140 in response to the publisher server 140 communicating a content item from the third party system 120 to a user. Third party systems 120 are associated with systems or domains different than the domain of the online system 100. In general, the publisher server selects either the online system 100 or a third party system 120 to provide content items for users accessing the publisher server based on the value provided by the online system 100 and the third party system 120.

A publisher server 140 provides content or other information for communication via a client device 110. A publisher server 140 is associated with one or more servers outside of the domain of the online system 100. The communicated content may be created by the entity that owns the publisher server 140. Such an entity may be a company (e.g., a publisher of content) or other type of organization offering a product (e.g., a tangible object or an intangible service), or message that the company wishes to promote. In one embodiment, a publisher server 140 includes an application provider communicating information describing applications for execution by a client device 110 or communicating data to client devices 110 for use by an application executing on the client device 110.

In one embodiment, a publisher server 140 communicates content on a webpage (or an application or any other suitable user interface) displayed on a client device 110. The webpage may include content from the publisher server 140 as well as one or more "impression opportunities" to include a content item from the online system 100 or a third party system 120. For example, the publisher server 140 is owned by a publisher of sports-related content, e.g., news articles, game scores, photos, videos, etc. The publisher server 140 displays an article about a sports team on a webpage. The webpage includes a designated area (e.g., a top or bottom banner, or a side column of the webpage, or in-line with the article) where a content item may be displayed. When a user of the client device 110 views the webpage, an "impression" occurs when the user views a content item displayed in the designated area. An "impression opportunity" refers to the opportunity for a content item to be displayed in the designated area when the impression is generated.

Following in the above example, the online system 100 and the third party system 120 may be interested in providing a content item for display in the designated area. For instance, the online system 100 has a first candidate content item describing apparel (e.g., sports caps and jerseys) of the sports team associated with the article. Thus, the online system 100 determines that there is a high likelihood that the user viewing the webpage will be interested in or interact with the content item. Similarly, the third party system 120 has a second candidate content item describing tickets to an upcoming game of the sports team. In this example, since the designated area has space to display one of the two candidate content items, the publisher server 140 decides which one to display.

The publisher server 140 determines systems from which to provide candidate content items to display for impression opportunities based on content item values, in some embodiments. In particular, when an impression opportunity is generated, the publisher server 140 requests content item values from the online system 100 and the third party system 120. The online system 100 and the third party system 120 may provide content item values corresponding to the first and second candidate content items.

In one example, the publisher server 140 receives an amount of compensation proportional to the corresponding content item value. Thus, to increase the received compensation, the publisher server 140 may select the greatest content item value received. Since the online system 100 and the third party system 120 are competing for their content item values to be selected by the publisher server 140, it is important for the systems to determine accurate content item values and with low latency, for example. Referring to the above example, if the online system 100 determines that there is a high likelihood that the user viewing the webpage will click on the first candidate content item describing apparel, the online system 100 provides a greater content item value, relative to another content item value for a candidate content item that is unlikely to interest the user (e.g., a content item describing apparel for a rival team of the sports team). In other embodiments, the publisher server 140 may select the first content item value received rather than the greatest content item value received. This way, the publisher server 140 reduces the latency required to display a content item, e.g., which can provide a more engaging user experience because the viewing user does not have to wait as long for the content item to load for display.

In some embodiments, the online system 100 may determine the trade-off between the likelihood of a content item value being selected and the corresponding compensation. In particular, it is desirable for the online system 100 to increase the likelihood that publisher server 140 will select the content item values provided by the online system 100, and decrease the amount of compensation that the online system 100 provides to the publisher server 140. Thus, a content item value may represent a minimum value bid of the online system 100 for a corresponding impression opportunity or content item.

In some embodiments, a webpage of the publisher server 140 may have more than one impression opportunity. For instance, the webpage has two designated areas (e.g., a top banner and a side column) each including space to display a content item. The publisher server 140 may request and select content item values for multiple impression opportunities independently or together. Further, the designated areas may have different parameters, for example, dimensions or aspect ratio of the designated area, a type of content item to be displayed (e.g., a content item with text only or a video), or a certain time of day and/or date during which content items are displayed.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130.

In one embodiment, a client device 110 executes an application allowing a user of the client device 110 to interact with the online system 100, a third party system 120, or a publisher server 140. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

II. Example System Architecture of Online System

Figure 2:
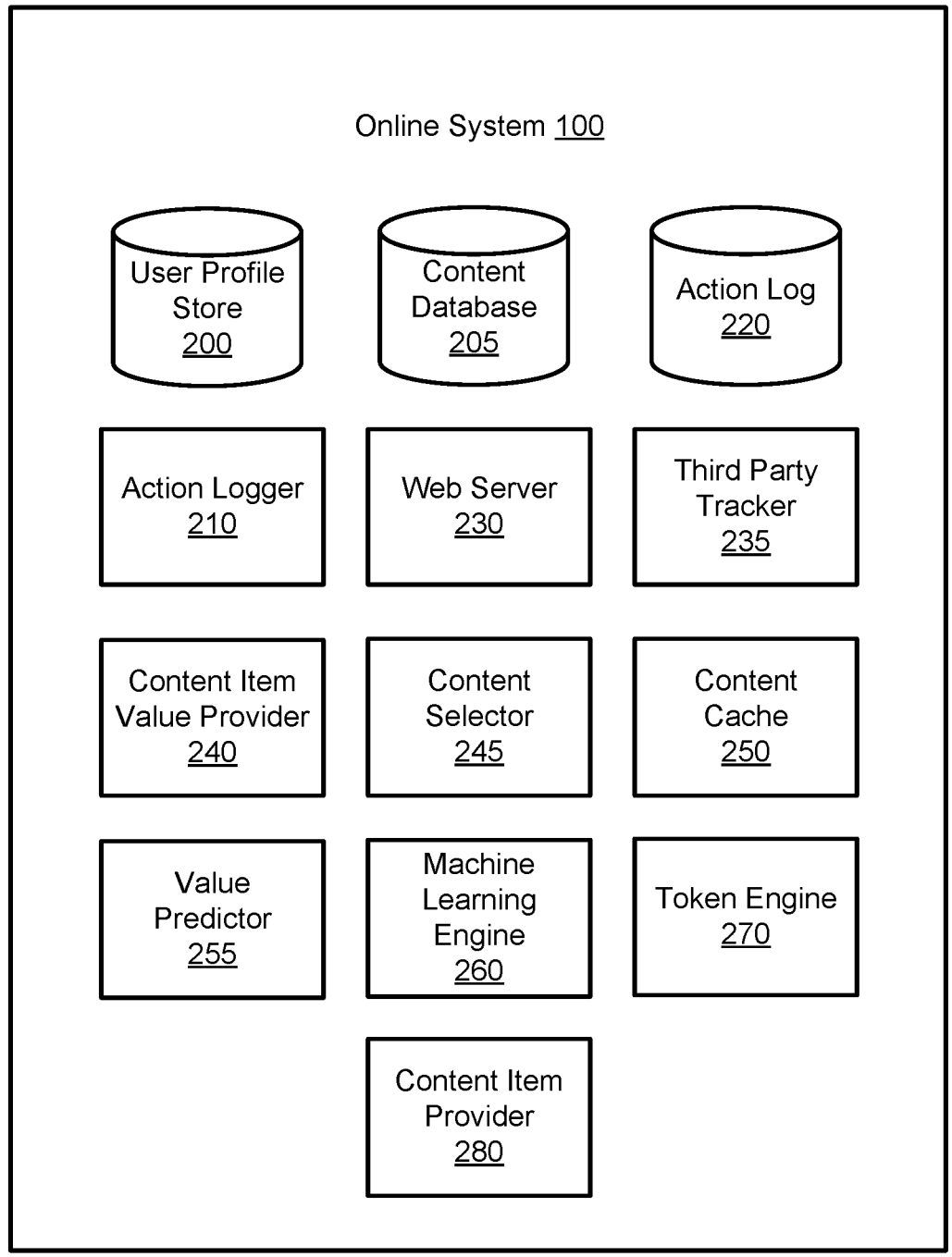
FIG. 2 is a block diagram illustrating the system architecture of an online system for determining content item values according to one embodiment.

FIG. 2 is a block diagram illustrating the system architecture of the online system 100 for determining content item values according to one embodiment. The online system 100 includes a user profile store 200, content database 205, action logger 210, action log 220, web server 230, third party tracker 235, content item value provider 240, content selector 245, content cache 250, value predictor 255, machine learning engine 260, token engine 270, and content item provider 280. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, and the like.

The user profile store 200 can store user profiles associated with individuals, as well as user profiles associated with entities such as businesses or organizations, e.g., that own a publisher server 140 or a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track user actions on the online system 100, as well as actions on publisher servers 140 and third party systems 120 that communicate information to the online system 100. Users may interact with various objects on the online system 100, and the action logger 210 stores information describing these interactions in the action log 220. Examples of interactions with objects include: interacting with a content items displayed on a user interface of a publisher server 140, viewing products on a brand page, commenting on posts, sharing links, and checking-in to physical locations via a mobile device, and any other interactions. Additional examples of interactions with objects on the online system 100 that are included in the action log 220 include: acquiring a product from a third party system 120, commenting on a photo album, communicating with a user, establishing a connection with an object, joining an event to a calendar, joining a group, creating an event, authorizing an application, using an application, and expressing a preference for an object ("liking" the object).

In some embodiments, the online system 100 infers interests or preferences of a user based on data from the action log 220, which augments the interests included in the user's user profile and allows a more complete understanding of user preferences. The action log 220 can record information about client devices 110 that a user uses to interact with the online system 100. For example, the action log 220 records whether the user used a laptop computer or smartphone client device to interact with the online system 100. Further, the action log 220 may include information about the types of client devices 110, e.g., smartphone running an IOS® or ANDROID™ operating system.

The action log 220 may also store user actions performed on a publisher server 140 and/or third party system 120, such as an external website, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a publisher server 140 and/or third party system 120 including webpage viewing histories, content that were engaged, acquisitions made, and other patterns from past actions. The action log 220 can also store information about user actions performed on a publisher server 140 received from the third party tracker 235, which are further described below.

The web server 230 links the online system 100 (and third party systems 120) via the network 130 to the client devices 110 and publisher servers 140. The web server 230 serves web pages, as well as other web-related content, such as JAVA®, FLASH®, XML and so forth. The web server 230 may receive and route messages between the online system 100, a client device 110, a publisher server 140, and/or a third party system 120, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

In one embodiment, the third party tracker 235 receives information from publisher servers 140 and/or third party systems 120 using pixel tracking. For example, the third party tracker 235 provides a pixel to a publisher server 140 to be included in a webpage (or any other suitable user interface) associated with the publisher server 140. The pixel may be associated with information such as a publisher identifier corresponding to the publisher server 140. The publisher identifier may indicate a designated area available for displaying content items in the webpage. The publisher server 140 provides information (e.g., including the publisher identifier) to the third party tracker 235 in response to a client device 110 displaying the pixel on the webpage.

The content item value provider 240 receives requests for content item values from publisher servers 140. In response to receiving a content item value request from a publisher server 140, the content item value provider 240 can provide a content item value to the publisher server 140. In some use cases, the content item value provider 240 determines to not provide a content item value in response to receiving a content item value request. The content item value provider 240 may determine content item values using one or more different types of content item value predictors, which are further described below and with reference to FIGS. 4A-B. The content item value provider 240 can determine content item values in real-time when a content item value request is received, or in advance before receiving the content item value request.

In some embodiments, a content item value request from a publisher server 140 received by the content item value provider 240 is associated with user information and a publisher identifier of the publisher server 140. For example, the user information describes a user of a client device 110 displaying a webpage of the publisher server 140, and the content item value request is associated with an impression opportunity to display a content item on the webpage to the user. The content item value provider 240 can determine that the user information is associated with a user account stored in the user profile store 200.

Further, the content item value provider 240 can validate the publisher server 140 based on the publisher identifier. For example, the online system 100 has a known set of publisher identifiers associated with different publisher servers 140, designated areas of webpages of the publisher servers 140, or other information regarding impression opportunities for which the online system 100 is authorized to provide content items. The publisher identifier may be a string unique to the corresponding publisher server 140. Thus, the content item value provider 240 validates the publisher server 140 by comparing the publisher identifier of the content item value request received for an impression opportunity to the known set of publisher identifiers. A publisher identifier may be invalid, for example, if the publisher identifier is not included in the known set of publisher identifiers, or if the publisher identifier is included in a blacklist (e.g., due to contractual information of the online system 100). If the content item value provider 240 determines that a received publisher identifier is invalid, the content item value provider 240 can determine to not provide a content item value in response to the corresponding request.

The content database 205 stores content items that may be associated with content item values. The content item value of a stored content item may be modified (or added) based on new content item value determined by the online system 100. In some embodiments, the stored content items are associated with additional parameters other than content item values. The parameters may include user information describing a target user or audience for a content item, e.g., a content item describing sports apparel is targeted to users who liked a brand page of a local sports team or are friends with other users who acquired sports apparel via a content item displayed from an impression opportunity. The parameters may also include publisher information (e.g., publisher identifiers) describing a target type of publisher server 140, e.g., the content item describing sports apparel is targeted to publisher servers that provide sports news articles and scores of sports games.

The content selector 245 provides content item values based on information associated with a content item value request. For example, the information includes target user information and a target publisher identifier. The content item value request is for a target impression opportunity to display a content item to a user described by the target user information. Additionally, the target impression opportunity is to display the content item on a publisher server 140 associated with the target publisher identifier. The content selector 245 selects a content item value of a content item in the content database 205 associated with similar (or the same) parameters as the target user information and/or target publisher identifier. Thus, the content selector 245 is a type of content item value predictor of the online system 100. In particular, the content selector 245 predicts content item values based on a database of available content item values.

The content cache 250 stores content item values that the content item value provider 240 recently provided to publisher servers 140. For instance, the content cache 250 stores the content item values provided during the past minute, hour, day, week, etc. The content cache 250 may also store content items associated with stored content item values (or a reference to content item stored in the content database 205 that is associated with a content item value in the content cache 250). The content cache 250 can provide one or more of the stored content item values in response to receiving a request for a content item value, e.g., from the content item value provider 240.

In one embodiment, the content cache 250 selects which content item values to provide based on information associated with the content item value request, similar to the content selector 245. In contrast to the content selector 245, rather than searching from the content database 205, the content cache 250 selects a content item value in the content cache 250 that was recently provided for one or more other impression opportunities associated with similar (or the same) parameters as the target user information and/or target publisher identifier. Thus, the content cache 250 is a type of content item value predictor that predicts content item values based on the cache of recently provided content item values.

The value predictor 255 is another type of content item value predictor of the online system 100. In some embodiments, the value predictor 255 determines content item values based on the average "Cost Per Impression" (CPI) and/or "Cost Per Action" (CPA). The value predictor 255 may determine the average CPI based on the average amount of compensation provided by the content item value provider 240 to publisher servers 140 for displaying content items to users for impression opportunities.

The value predictor 255 may determine the average CPA based on the average amount of compensation provided by the online system 100 to publisher servers 140 for displaying content items to users, where the users performed an action with the displayed content item. The actions taken into account for CPA may include, e.g., clicking on the content item, registration to a service or product described in the content item, or completing an acquisition of a service or product. The value predictor 255 may determine the average CPI and CPA based on compensations for impression opportunities provided by the content item value provider 240 during a certain period of time, e.g., the past day, month, year, etc. Thus, the value predictor 255 predicts content item values based on metrics determined using historical data of previously provided content item values.

The machine learning engine 260 uses machine learning techniques to train one or more models, e.g., content item value predictors. Machine learning techniques include, for example, linear regression, decision trees, support vector machines, classifiers (e.g., a Naive Bayes classifier), gradient boosting, neural networks, deep learning, etc. The machine learning engine 260 trains models using feature vectors derived based on information associated with previously provided content item values and content items. In some embodiments, the machine learning engine 260 uses the training labels to partition information into positive and negative feature vectors for training sets. For example, positive feature vectors describe content item values that were selected by a publisher server 140 or content items interacted with by a user, while negative feature vectors describe content item values that were not selected by a publisher server 140 or content items that were displayed but not interacted with by a user. Thus, the models can predict content item values by learning based on the context of previously provided content item values and content items.

The token engine 270 generates tokens for storage on client devices 110. In one embodiment, the token engine 270 generates a token based on received user information or a received publisher identifier, which may or may not be associated with a content item value request from a publisher server 140. The token functions similar to a web cookie (also referred to as a cookie, an Internet cookie, or a browser cookie) for a website that is stored on a client device 110, for example. In an example use case, the content item value provider 240 receives a token from a client device 110, where the token is associated with a content item value request. The token engine 270 validates the received token by determining that the token was previously generated by the token engine 270. The content item value provider 240 provides a content item value in response to the request and validating the received token. The token may thus be used to verify that a user and publisher server 140 are eligible to receive a content item and the online system 100 may 'expect' the user to return to the publisher server 140 and present the token to the online system 100. The online system 100 may then precompute or predetermine the content item value for when the token is provided by the user's client device 110.

The content item provider 280 provides content items for communication to users of the online system 100. The content item provider 280 can analyze information stored in the user profile store 200 or action log 220 to identify information useful for generating content items. Further, based on actions performed by a population of users, the content item provider 280 can determine a likelihood that a given user will interact with a particular content item. In one example, the content item provider 280 provides content items associated with a likelihood greater than a threshold probability, e.g., to avoid displaying content items that are less likely to be of interest to users, and thus save resources for providing more favorable content items. The content item provider 280 may generate content items also based on information from publisher servers 140 and/or third party systems 120. The content item provider 280 can store content items in the content database 205, e.g., along with information such as a corresponding content item value determined by the content item value provider 240.

III. Example Sequence Diagrams for Requesting Content Item Values

Figure 3A:
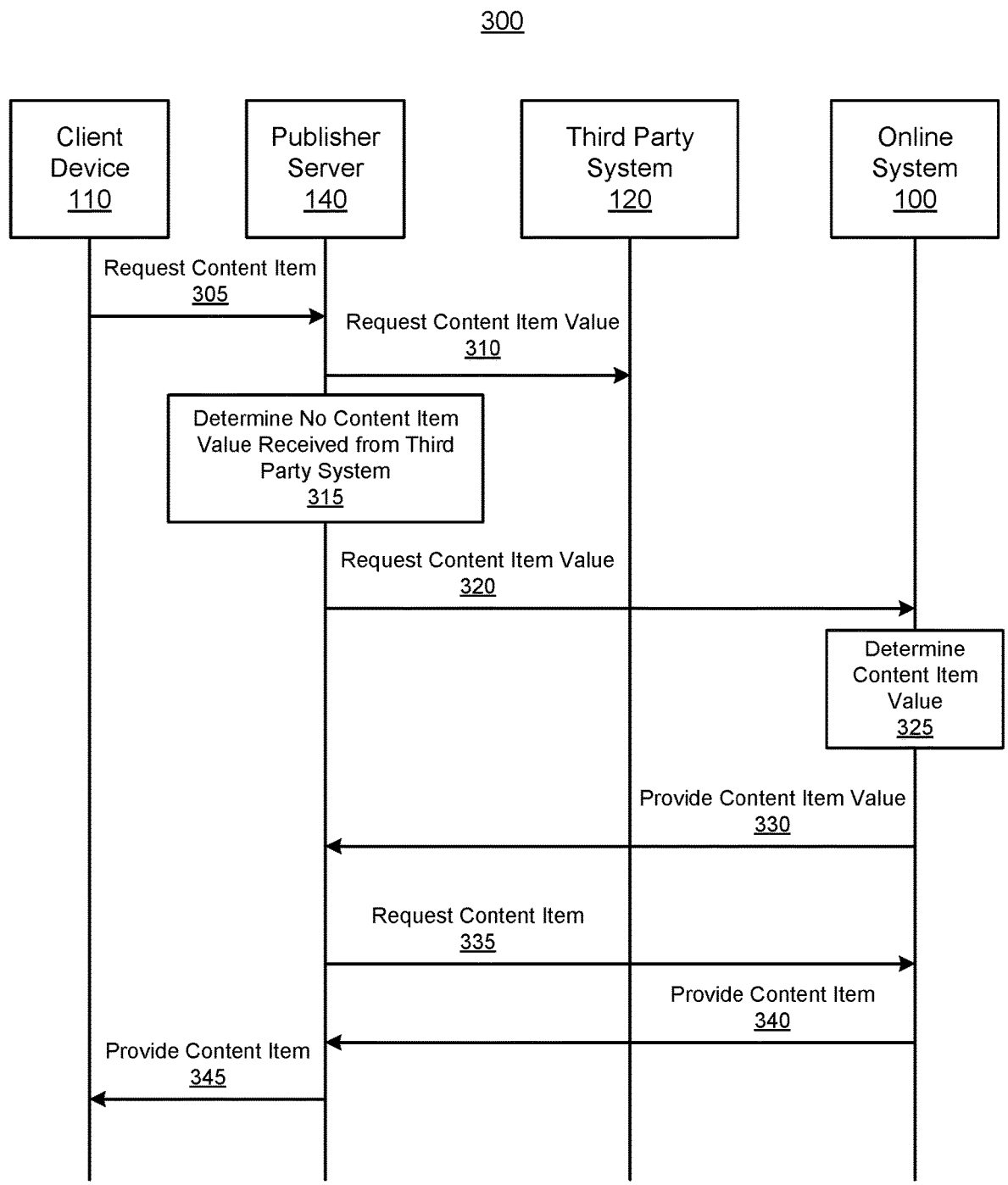
FIG. 3A is a sequence diagram for requesting content item values sequentially from multiple systems according to one embodiment.
Figure 3B:
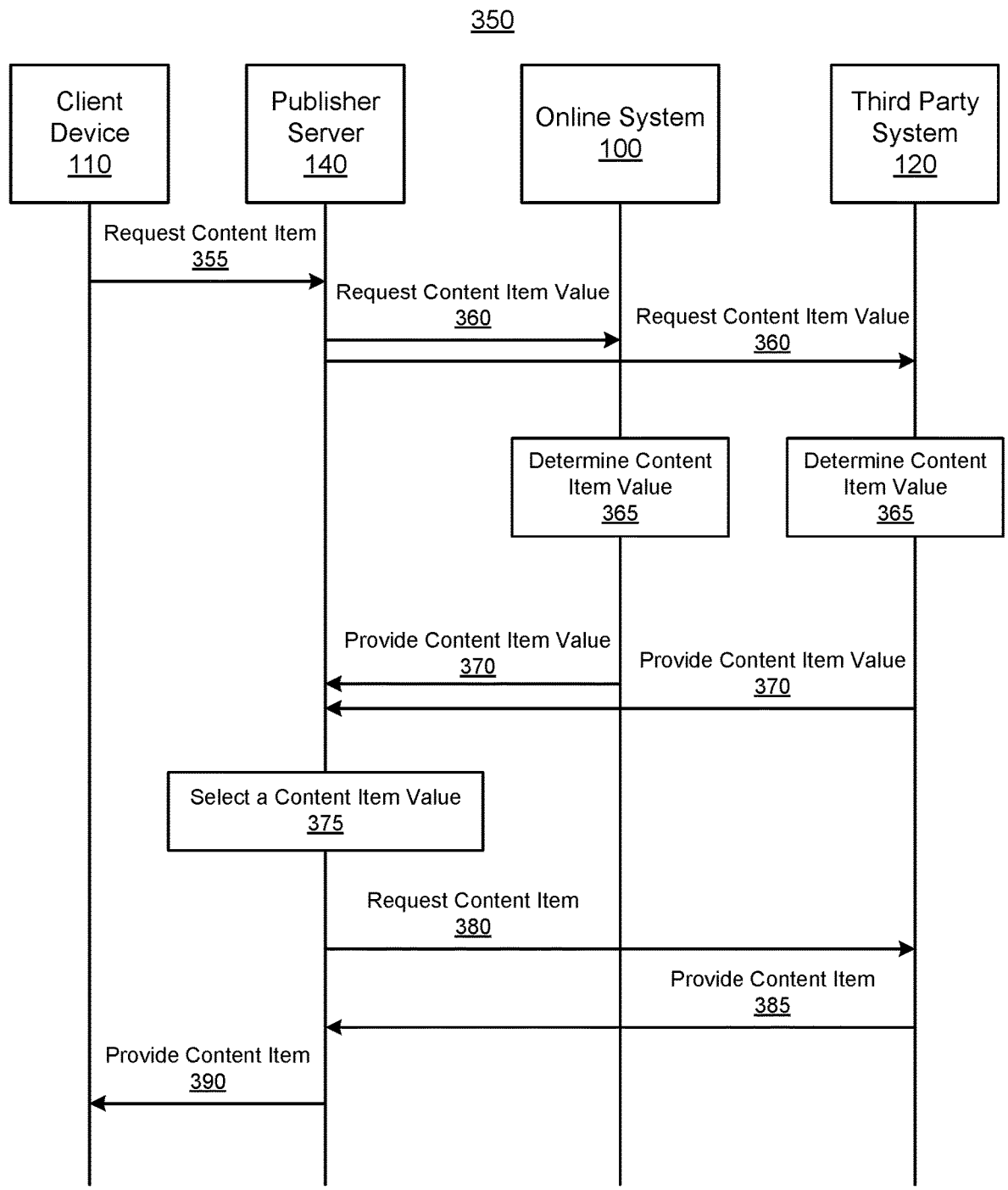
FIG. 3B is a sequence diagram for requesting content item values in parallel from multiple systems according to one embodiment.

FIGS. 3A and 3B are sequence diagrams showing two example architectures for requesting content item values. In both example architectures, the publisher server 140 requests content item values from the online system 100 and the third party system 120.

FIG. 3A is a sequence diagram 300 for requesting content item values sequentially from multiple systems according to one embodiment. The client device 110 requests 305 a content item from the publisher server 140 associated with an impression opportunity. To provide a content item for display for the impression opportunity, the publisher server 140 may typically select between the online system 100 and the third party system 120 by selecting the system that first provides a content item value. In this example, the publisher server 140 requests 310 a content item value from the third party system 120 based on a sequential order where the third party system 120 is first in the order and the online system 100 is second. The publisher server 140 determines 315 that no content item value is received from the third party system 120 (e.g., based on a time-out period or receiving an indication of no content item value). Thus, the publisher server 140 requests 320 a content item value from the online system 100, which is next in the sequential order. The online system 100 determines 325 a content item value in response to the request and provides 330 the content item value to the publisher server 140.

In this example, since the content item value from the online system 100 is the first content item value received, the publisher server 140 requests 335 a content item from the online system 100. The online system 100 provides 340 a content item in response to the content item request. The publisher server 140 provides 345 the content item for display on the client device 110. If the third party system 120 provided a content item value in response to the publisher server's content item value request, the publisher server 140 would request a content item from the third party system 120 rather than from the online system 100.

In other embodiments, the publisher server 140 selects a system (e.g., the online system 100 or a third party system 120) from which to provide a content item for the impression opportunity, rather than request the content item from the selected system. Thus, in the example above, the online system 100 may provide the content item directly to the client device 110 (e.g., responsive to receiving an indication from the publisher server 140 that the online system 100 has been selected for the impression opportunity) for display instead of providing the content item indirectly via the publisher server 140.

FIG. 3B is a sequence diagram 350 for requesting content item values in parallel from multiple systems according to one embodiment. The client device 110 requests 355 a content item from the publisher server 140 associated with an impression opportunity. To provide a content item for display for the impression opportunity, the publisher server 140 requests 360 content item values from the online system 100 and the third party system 120 in parallel. The online system 100 and the third party system 120 each determine 365 a content item value in response to the request and provide 370 the content item value to the publisher server 140.

The publisher server 140 selects 375 a content item value from the received content item values. In contrast to the architecture shown in FIG. 3A where the publisher server 140 selects the first content item value received, the publisher server 140 in FIG. 3B selects the greatest content item value among the received content item values, in some embodiments. In one example, the content item value provided by the online system 100 is greater than the content item value provided by the third party system 120. Thus, the publisher server 140 requests 380 a content item from the online system 100. The online system 100 provides 385 a content item to the publisher server 140, and the publisher server 140 provides 390 the content item for display on the client device 110.

IV. Example Content Item Value Predictors

IV. A. Example Data Flow Diagram

Figure 4A:
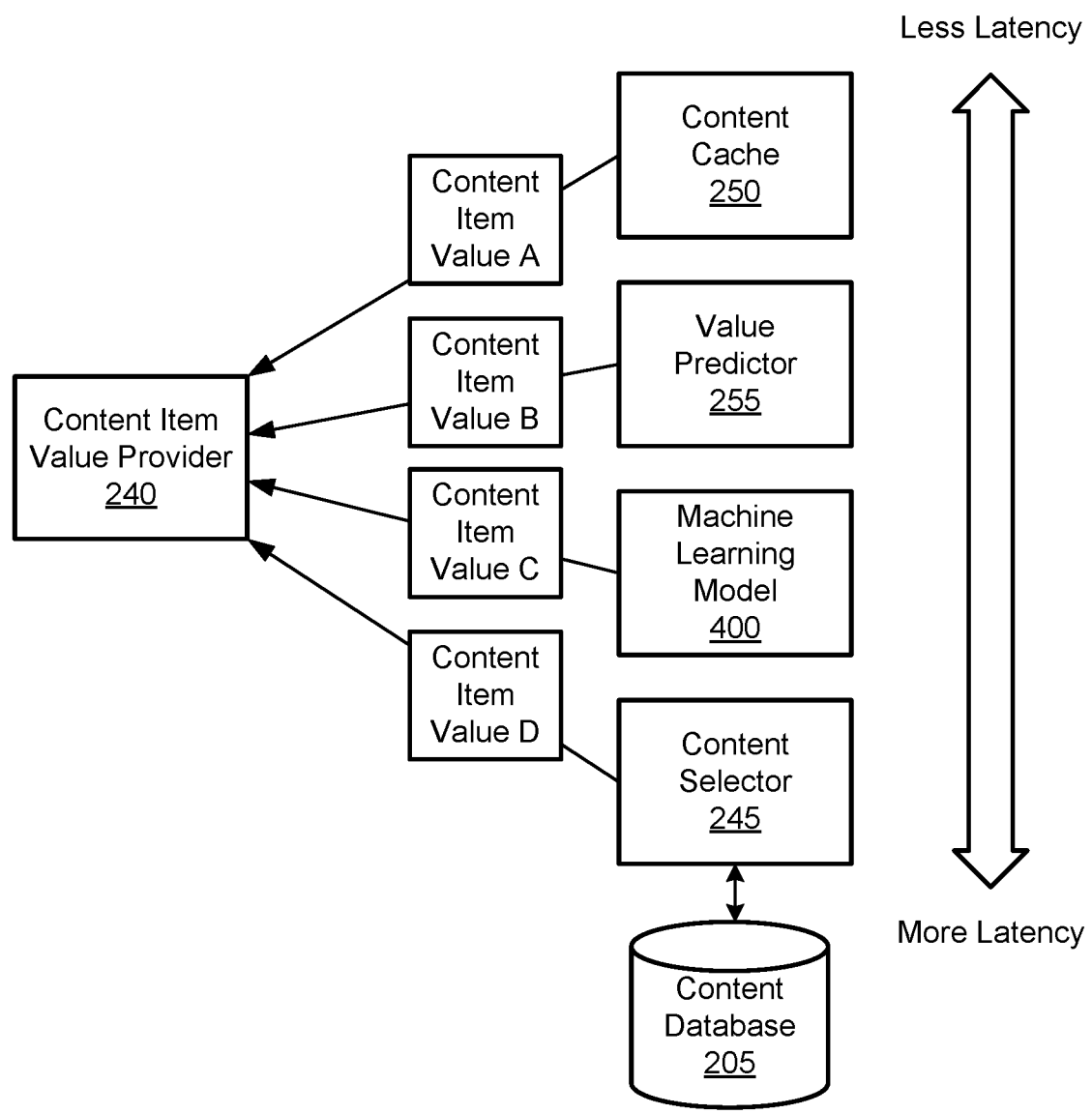
FIG. 4A is a diagram of different types of content item value predictors according to one embodiment.

FIG. 4A is a diagram of different types of content item value predictors according to one embodiment. The content item value provider 240 may receive multiple content item values from different content item value predictors in response to requests for content item values. In the example shown in FIG. 4A, the four content item value predictors, the content cache 250, value predictor 255, machine learning model 400 (e.g., trained by the machine learning engine 260), and content selector 245 provide the content item values A, B, C, and D, respectively. Each of content item value predictors may have an average latency. The average latency of a content item value predictor represents the average amount of time it takes for the content item value predictor to provide a content item value in response to receiving a content item value request.

In the embodiment shown in FIG. 4A, the content item value predictors are shown based on the corresponding average latency, where the content cache 250 has the least latency and the content selector 245 has the greatest latency. It should be noted that in other embodiments, the order of the content item value predictors based on average latency may vary. For an example impression opportunity, the content selector 245 has the greatest latency because the content selector 245 analyzes a large number of content items and content item values in the content database 205, which may be computationally expensive, for example. On the other hand, the content cache 250 has the least latency because the content cache 250 analyzes a smaller number of content items (e.g., relative to the number searched by the content selector 245) and content item values in the content cache 250, for example.

For the same example impression opportunity, the value predictor 255 and machine learning model 400 consume an amount of computational resources that falls in between the amounts consumed by the content cache 250 and the content selector 245. Thus, the value predictor 255 and machine learning model 400 have average latencies in between those of the content cache 250 and the content selector 245.

Since the content item value predictors are ordered by average latency as shown in FIG. 4A, the order based on latency for a particular content item value request can vary between different impression opportunities. For instance, the range of latencies for the content cache 250 and value predictor 255 may overlap, so either content item value predictor could provide a content item value quicker than the other for the particular content item value request.

In one embodiment, the content item value provider 240 simultaneously (or close to simultaneously) provides content item value requests to each of the available content item predictors. The content item value provider 240 waits until it has received a content item value from each of the available content item predictors, e.g., within a certain time-out period. One or more of the content item predictors may not necessarily provide a content item value (e.g., the content cache 250 does not include any content items that match parameters of target user information and/or a target publisher identifier). From the received content item values, the content item value provider 240 selects a content item value according to various criteria. In one example, the content item value provider 240 selects the first content item value received. As another example, the content item value provider 240 selects the greatest content item value received. In other embodiments, the content item value provider 240 does not necessarily select the greatest content item value received, and instead may select the most accurate or reliable content item value received within a threshold duration of time (e.g., after providing the content item value requests) for providing a content item value to the publisher server 140. The accuracy or reliability of a content item value received by a content item predictor may depend on the type of the content item predictor and a corresponding latency of the content item predictor. For instance, content item predictors with greater latency provide more accurate and reliable content item values because these content item predictors analyze a larger number of content items and content item values, relative to content item predictors with less latency.

In some embodiments, the content item value provider 240 provides content item value requests sequentially to each of the available content item predictors. For example, the content item value provider 240 provides a content item value request to the content cache 250. If the content item value provider 240 does not receive a content item value from the content cache 250 within a time-out period, the content item value provider 240 provides a content item value request to the value predictor 255, e.g., because the value predictor 255 has the second lowest average latency among the content item value predictors shown in FIG. 4A. If the value predictor 255 times out, the content item value provider 240 provides a content item value request to the machine learning model 400. If the machine learning model 400 times out, the content item value provider 240 provides a content item value request to the content selector 245.

In some embodiments, the content item values determined by the content item value predictors serve as a proxy for the likelihood that the content item values will be selected by a publisher server 140 and/or the likelihood that a user will interact with the corresponding content item. For example, a content item value predictor determines that the online system 100 includes a candidate content item that, if displayed to a target user for impression opportunity, has a high likelihood of being interacted with by the target user; thus, the content item value predictor determines a greater content item value for the candidate content item. The publisher server 140 is more likely to select the content item value as the content item value increases.

The content item value, or accuracy and reliability of content item values, may not necessarily be proportional to the average latencies of the content item value predictors. For example, the value predictor 255 provides content item values that are greater, on average, than the content item values provided by the content cache 250. In addition, the value predictor 255 has an average latency greater than that of the content cache 250. However, for a given impression opportunity, the value predictor 255 can provide a content item value less than a content item value provided by the content cache 250 and/or requiring a latency less than the latency of the content cache 250.

IV. B. Example Process Flow

FIG. 4B is a flowchart illustrating a process 410 for optimizing the determination of content item values according to one embodiment. In some embodiments, the process 410 is performed by the online system 100—e.g., modules of the online system 100 described with reference to FIG. 2—within the system environment in FIG. 4B. The process 410 may include different or additional steps than those described in conjunction with FIG. 4B in some embodiments or perform steps in different orders than the order described in conjunction with FIG. 4B.

In one embodiment, the online system 100 receives 420 a content item value request from a publisher server 140. The content item value request may be associated with an impression opportunity to provide a content item for display to a user on a webpage of the publisher server 140. Further, the publisher server 140 may also provide additional content item value requests for the impression opportunity to one or more third party systems 120. The content item value provider 240 provides 430 content item value requests to a set of value predictors.

The set of value predictors includes at least a first value predictor and a second value predictor. The first value predictor provides responses within a first average duration of time, and the second value predictor provides responses within a second average duration of time greater than the first average duration of time. For example, the first value predictor is a content cache 250; in other words, the first value predictor provides responses based on a cache of content item values previously provided to the publisher server 140 (or other publisher servers) within a period of time preceding receiving the content item value request. The second value predictor may be a different type of value predictor, e.g., a value predictor 355, machine learning model 400, or content selector 245.

The content item value provider 240 receives 440 one or more responses from the set of value predictors, where each response has a content item value. The content item value provider 240 selects 450 a content item value of one of the responses, e.g., based on the greatest content item value of the first content item value received within a time-out period. In some embodiments, the content item value provider 240 selects the content item value before receiving the content item value request. Thus, the online system 100 can reduce the latency between receiving the content item value request and responding to the content item value request by providing a content item value.

The content item value provider 240 provides 460 the selected content item value to the publisher server 140. The online system 100 receives 470 a content item request in response to providing the selected content item value. For example, the publisher server 140 determines to provide the content item request to the online system 100 because the selected content item value is greater than another content item value of the third party system 120. In response to the received content item value request, the content item provider 280 selects 480 a content item based on the selected content item value. The content item provider 280 may provide the selected content item for display in the webpage of the publisher server 140, e.g., on a client device 110 of a user viewing the webpage.

V. Example Token Architecture

V. A. Example Sequence Diagram

Figure 5:
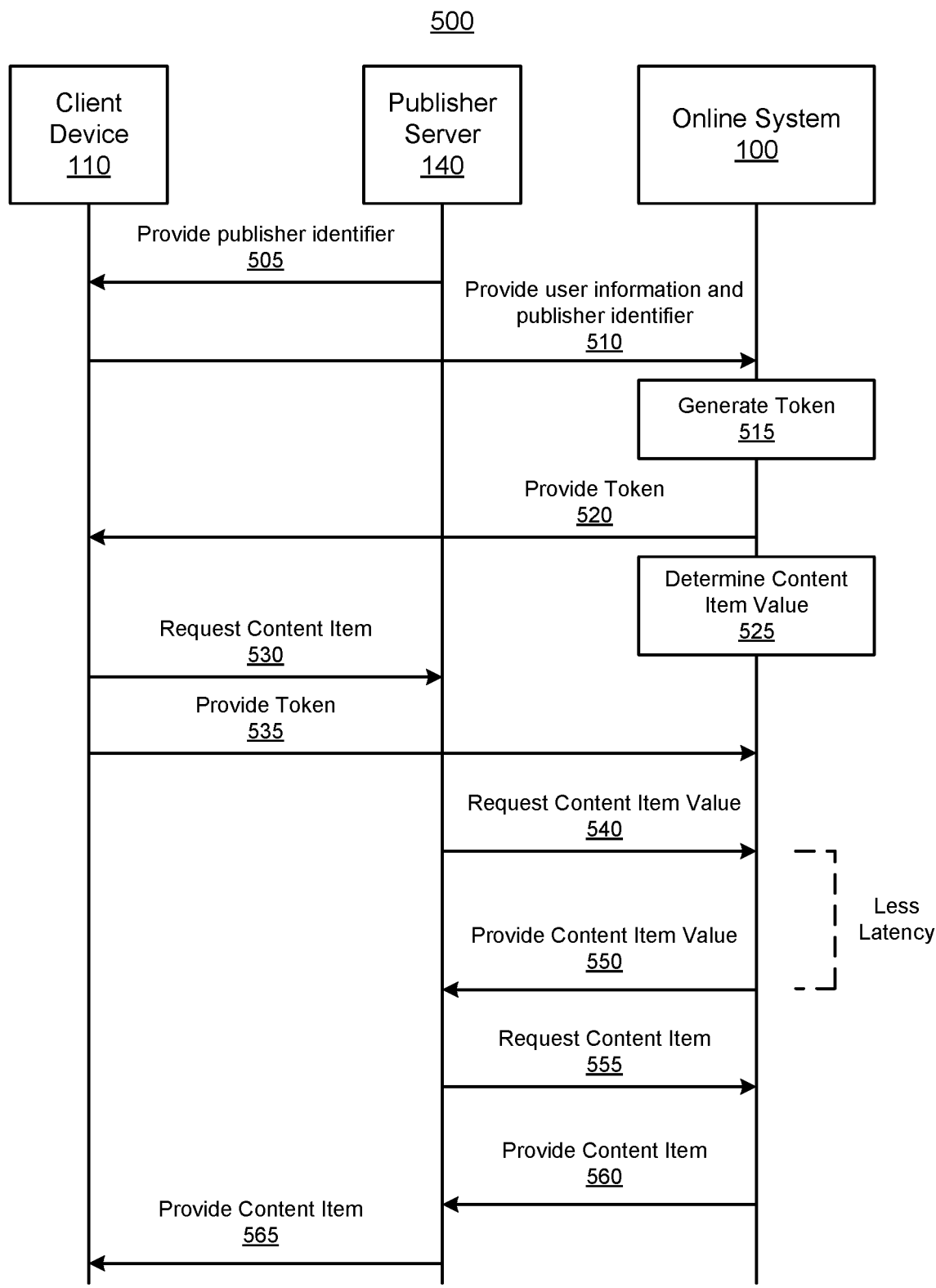
FIG. 5 is a sequence diagram for requesting content item values using a token architecture according to one embodiment.

FIG. 5 is a sequence diagram 500 for requesting content item values using a token architecture according to one embodiment. In contrast to the architectures shown in FIGS. 3A-B, the token architecture shown FIG. 5 allows the online system 100 to determine content item values in advance of receiving requests for content item values.

In one embodiment, a publisher server 140 provides 505 a publisher identifier of the publisher server 140 to the client device 110. The client device 110 provides user information (e.g., describing a user of the client device 110) and the publisher identifier to the online system 100. In other embodiments, the client device 110 provides the user information to the publisher server 140, and the publisher server 140 provides the user information and publisher identifier to the online system 100. The online system 100 generates 515 a token based on the received user information and the publisher identifier. The online system 100 provides 520 the token to the client device 110.

The online system 100 determines 525 a content item value, for example, using one or more different value predictors as previously described with reference to FIGS. 4A-B. The content item value may be referred to as a "candidate content item value," which is determined before receiving a request for a content item value. The content item value provider 240 may determine the candidate content item value based on the user information and/or publisher identifier used to generate the token. Accordingly, the content item value provider 240 may associate the candidate content item value with the token.

In an example, a user of the client device 110 views a webpage of the publisher server 140, which generates an impression opportunity to display a content item on the webpage. Thus, the client device 110 requests 530 a content item from the publisher server 140 for the impression opportunity. The client device 110 also provides 535 the token to the online system 100. To determine a content item for the impression opportunity, the publisher server 140 requests 540 a content item value from the online system 100.

In some embodiments, the client device 110 provides the token to the publisher server 140. The publisher server 140 may provide the token to the online system 100, rather than the client device 110 directly providing the token to the online system 100. In an example, the token indicates that the online system 100 will provide a content item value in response to a content item value request from a publisher server 140, e.g., associated with the token. Since the token is a commitment of the online system 100, the publisher server 140 may determine to provide a content item value request only to the online system 100, rather than providing additional content item value requests to other third party systems 120. This is advantageous, for example, because the online system 100 would not have to compete with the other third party systems 120 to provide a content item for display for a given impression opportunity.

In response to receiving the content item value request, the online system 100 provides 550 the candidate content item value to the publisher server 140. In an example, the online system 100 determines that the token provided by the client device 110 corresponds to the token associated with the candidate content item value. Thus, the online system 100 does not need to determine another content item value after receiving the request. Accordingly, the online system 100 reduces the latency between receiving the request and providing the candidate content item value because the online system 100 can retrieve the candidate content item value that was previously determined. In an example, reducing the latency is advantageous because a publisher server 140 may be more likely to select a content item value based on how quickly the publisher server 140 receives the content item value.

The online system 100 generates multiple tokens each associated with different user information and publisher identifiers, in some embodiments. Further, the online system 100 generates multiple candidate content item values each associated with one of the tokens. When the online system 100 receives requests for content item values along with a token, the online system 100 retrieves the candidate content item value associated with the token. For instance, a first candidate content item value is associated with a first token for website of cooking recipes and a second candidate content item value is associated with a second token for another website of world news articles. For an impression opportunity generated when a user views the cooking recipes website, the online system 100 retrieves the first candidate content item value. On the other hand, for another impression opportunity generated when the user views the world news article website, the online system 100 retrieves the second candidate content item value.

In some embodiments, rather than the client device 110 directly providing the token to the online system 100, the client device 110 provides the token to the publisher server 140, and the publisher server 140 provides the token to the online system 100.

The publisher server 140 requests 555 a content item from the online system 100 in response to selecting the candidate content item value for the impression opportunity. In response to the content item request, the online system 100 provides 560 a content item to the publisher server 140. In some embodiments, the online system 100 selects the content item before receiving the content item request, e.g., when the content item value provider 240 determines the candidate content item value, the content item provider 280 selects a content item associated with the candidate content item value. Thus, the online system 100 can also reduce the latency between receiving and responding to content item requests using candidate content item values.

The publisher server 140 provides 565 the content item to the client device 110 for display in the webpage of the publisher server. In other embodiments, the online system 100 provides the content item directly to the client device 110, rather than indirectly via the publisher server 140.

V. B. Example Process Flow

FIG. 6 is a flowchart illustrating a process 600 for determining content item values using a token architecture according to one embodiment. In some embodiments, the process 600 is performed by the online system 100—e.g., modules of the online system 100 described with reference to FIG. 2—within the system environment in FIG. 1. The process 600 may include different or additional steps than those described in conjunction with FIG. 6 in some embodiments or perform steps in different orders than the order described in conjunction with FIG. 6.

In one embodiment, the online system 100 receives 610 user information from a client device 110 and a publisher identifier from a publisher server 140. The token engine 270 generates 620 a token in response to determining that the user information is associated with a user account on the online system 100 and/or validating the publisher server 140 based on the publisher identifier. The token engine 270 may associate the token with the user account and store the token in a database of the online system 100. The online system 100 provides 630 the token to the client device 110 for storage. The content item value provider 240 determines 640 a candidate content item value before receiving a content item value request. The content item value provider 240 can determine the candidate content item value based at least in part on the user information and the publisher identifier. The content item value provider 240 provides 650 the candidate content item value to the publisher server 140 in response to receiving the content item value request and receiving the token, e.g., from the publisher server 140 and/or the client device 110.

VI. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, user information for a user of the online system from a client device and a publisher identifier of a publisher server;
in response to (i) determining that the user information is associated with a user account on the online system and (ii) validating the publisher server based on the publisher identifier, generating a token associated with the user account;
providing the token to the client device for storage;
determining, before receiving a content item value request, a candidate content item and a candidate content item value to provide to the publisher server based at least in part on the user information and the publisher identifier stored on the token provided to the client device;
receiving, from the client device, the token associated with the user account, the receipt of the token indicating that the online system will receive a content item value request from the publisher server within a period of time;
receiving, from the publisher server, the content item value request for a candidate content item to be presented to a user; and
providing the candidate content item value to the publisher server in response to receiving the content item value request and receiving the token.

2. The method of claim 1, further comprising:
receiving a content item request in response to providing the candidate content item value to the publisher server; and
providing a candidate content item to the publisher server in response to the content item request, the candidate content item provided to the client device for display to a user of the client device.

3. The method of claim 2, further comprising:
determining a likelihood that the user of the client device will interact with the candidate content item based at least in part on interactions performed by a population of users of the online system;
wherein providing the candidate content item to the publisher server is further based on determining that the likelihood is greater than a threshold probability.

4. The method of claim 2, further comprising:
providing, from the online system to a third party associated with the publisher server, an amount of compensation corresponding to the candidate content item value in response to the candidate content item being provided to the client device for display to the user of the client device.

5. The method of claim 1, wherein the token indicates that the online system will provide the candidate content item value to the publisher server in response to receiving the content item value request.

6. The method of claim 1, further comprising:
determining a plurality of content item values to provide to the publisher server based on a plurality of tokens generated by the online system including at least the token, each content item value associated with a content item to be provided to client devices for display to users of the online system.

7. The method of claim 1, wherein determining, before receiving the content item value request, the candidate content item value to provide to the publisher server comprises:
   providing content item value requests to a plurality of value predictors;
   receiving one or more content item values from the plurality of value predictors; and
   selecting a content item value of the one or more content item values, the selected content item value being the candidate content item value.

8. The method of claim 7, wherein the one or more content item values includes the candidate content item value and another content item value, and wherein selecting the content item value of the one or more content item values comprises:
   determining that the candidate content item value is greater than the another content item value.

9. A method comprising:
   receiving, by an online system, user information for a user of the online system from a client device and a publisher identifier of a publisher server;
   determining that the user information is associated with a user account on the online system;
   generating a token associated with the user account based at least in part on the user information and the publisher identifier;
   providing the token to the client device for storage;
   determining, before receiving a content item value request, a candidate content item value to provide to the publisher server;
   receiving, from the client device, the token associated with the user account, the receipt of the token indicating that the online system will receive a content item value request from the publisher server within a period of time;
   receiving, from the publisher server, the content item value request for a candidate content item to be presented to a user; and
   providing the candidate content item value to the publisher server in response to receiving the content item value request and receiving the token.

10. The method of claim 9, further comprising:
    receiving a content item request in response to providing the candidate content item value to the publisher server; and
    selecting a candidate content item for display to a user of the client device.

11. The method of claim 10, further comprising:
    providing, from the online system to a third party associated with the publisher server, an amount of compensation corresponding to the candidate content item value in response to the candidate content item being provided to the client device for display to the user of the client device.

12. The method of claim 9, further comprising:
    determining a plurality of content item values to provide to the publisher server based on a plurality of tokens generated by the online system including at least the token, each content item value associated with a content item to be provided to client devices for display to users of the online system.

13. A computer program product comprising a non-transitory computer readable storage medium having instructions encoded thereon that, when executed by a processor, cause the processor to:
    receive, by an online system, user information for a user of the online system from a client device and a publisher identifier of a publisher server;
    determine that the user information is associated with a user account on the online system;
    generate a token associated with the user account based at least in part on the user information and the publisher identifier;
    provide the token to the client device for storage;
    determine, before receiving a content item value request, a candidate content item value to provide to the publisher server;
    receive, from the client device, the token associated with the user account, the receipt of the token indicating that the online system will receive a content item value request from the publisher server within a period of time;
    receive, from the publisher server, the content item value request for a candidate content item to be presented to a user; and
    provide the candidate content item value to the publisher server in response to receiving the content item value request and receiving the token.

14. The non-transitory computer readable storage medium of claim 13, having further instructions that when executed by the processor cause the processor to:
    receive a content item request in response to providing the candidate content item value to the publisher server; and
    provide a candidate content item to the publisher server in response to the content item request, the candidate content item provided to the client device for display to a user of the client device.

15. The non-transitory computer readable storage medium of claim 14, having further instructions that when executed by the processor cause the processor to:
    determine a likelihood that the user of the client device will interact with the candidate content item based at least in part on interactions performed by a population of users of the online system;
    wherein providing the candidate content item to the publisher server is further based on determining that the likelihood is greater than a threshold probability.

16. The non-transitory computer readable storage medium of claim 14, having further instructions that when executed by the processor cause the processor to:
    provide, from the online system to a third party associated with the publisher server, an amount of compensation corresponding to the candidate content item value in response to the candidate content item being provided to the client device for display to the user of the client device.

17. The non-transitory computer readable storage medium of claim 13, wherein the token indicates that the online system will provide the candidate content item value to the publisher server in response to receiving the content item value request.

18. The non-transitory computer readable storage medium of claim 13, having further instructions that when executed by the processor cause the processor to:
    determine a plurality of content item values to provide to the publisher server based on a plurality of tokens generated by the online system including at least the token, each content item value associated with a content item to be provided to client devices for display to users of the online system.

19. The non-transitory computer readable storage medium of claim 13, wherein determine, before receiving the content item value request, the candidate content item value to provide to the publisher server comprises:
  provide content item value requests to a plurality of value predictors;
  receive one or more content item values from the plurality of value predictors; and
  select a content item value of the one or more content item values, the selected content item value being the candidate content item value.

20. The non-transitory computer readable storage medium of claim 19, wherein the one or more content item values includes the candidate content item value and another content item value, and wherein select the content item value of the one or more content item values comprises:
  determine that the candidate content item value is greater than the another content item value.

* * * * *